(12) United States Patent
Gao et al.

(10) Patent No.: US 11,038,642 B2
(45) Date of Patent: Jun. 15, 2021

(54) METHOD AND DEVICE FOR DYNAMICALLY DETERMINING A PILOT PATTERN

(71) Applicant: CHINA ACADEMY OF TELECOMMUNICATIONS TECHNOLOGY, Beijing (CN)

(72) Inventors: Xuejuan Gao, Beijing (CN); Fangchen Cheng, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 148 days.

(21) Appl. No.: 16/075,124

(22) PCT Filed: Jan. 23, 2017

(86) PCT No.: PCT/CN2017/072170
§ 371 (c)(1),
(2) Date: Aug. 2, 2018

(87) PCT Pub. No.: WO2017/133537
PCT Pub. Date: Aug. 10, 2017

(65) Prior Publication Data
US 2019/0044680 A1 Feb. 7, 2019

(30) Foreign Application Priority Data
Feb. 3, 2016 (CN) .......................... 201610076832.0

(51) Int. Cl.
*H04L 5/00* (2006.01)
*H04W 72/04* (2009.01)
*H04W 72/12* (2009.01)

(52) U.S. Cl.
CPC .......... *H04L 5/0048* (2013.01); *H04L 5/0007* (2013.01); *H04L 5/0091* (2013.01);
(Continued)

(58) Field of Classification Search
CPC ............ H04W 72/0413; H04W 72/042; H04L 5/0048; H04L 5/0007
See application file for complete search history.

(56) References Cited

U.S. PATENT DOCUMENTS

| 2004/0062321 A1* | 4/2004 | Nakamura | ............ H04W 52/50 375/295 |
| 2006/0198294 A1* | 9/2006 | Gerlach | ................ H04L 5/0048 370/208 |

(Continued)

FOREIGN PATENT DOCUMENTS

| CN | 101345974 A | 1/2009 |
| CN | 101415227 | * 4/2009 |

(Continued)

OTHER PUBLICATIONS

International Search Report for PCT/CN2017/072170 dated Mar. 27, 2017and its English translation provided by WIPO.

(Continued)

*Primary Examiner* — Yemane Mesfin
*Assistant Examiner* — Henry Baron
(74) *Attorney, Agent, or Firm* — Ladas & Parry, LLP

(57) ABSTRACT

A method and a device for determining dynamically a pilot pattern are provided. The method includes acquiring a TTI duration occupied by transmission of data, and determining a pilot pattern according to the TTI duration occupied by the transmission of the data.

10 Claims, 9 Drawing Sheets

(52) U.S. Cl.
CPC ..... *H04W 72/042* (2013.01); *H04W 72/0413* (2013.01); *H04W 72/0446* (2013.01); *H04W 72/1263* (2013.01)

(56) References Cited

U.S. PATENT DOCUMENTS

| | | |
|---|---|---|
| 2009/0168730 A1 | 7/2009 | Baum et al. |
| 2009/0296563 A1 | 12/2009 | Kishiyama et al. |
| 2013/0195002 A1 | 8/2013 | Walker et al. |
| 2014/0269520 A1* | 9/2014 | Yi .................. H04L 5/0048 370/329 |
| 2018/0054267 A1* | 2/2018 | Zhang ................ H04L 25/0226 |
| 2018/0310324 A1 | 10/2018 | Ibars Casas et al. |

FOREIGN PATENT DOCUMENTS

| | | |
|---|---|---|
| CN | 101415227 A | 4/2009 |
| JP | 2007089113 A | 4/2007 |
| JP | 2018527766 A | 9/2018 |
| WO | 2014139435 A | 9/2014 |
| WO | 2016195754 A | 12/2016 |

OTHER PUBLICATIONS

Written Opinion of the International Search Authority PCT/CN2017/072170 dated Mar. 27, 2017 and its English translation provided by Google Translate.
Extended European Search Report from EP app. No. 17746857.6, dated Jan. 21, 2019.
International Preliminary Report on Patentability from PCT/CN2017/072170, dated Aug. 7, 2018, with English translation from WIPO.
Written Opinion of the International Searching Authority from PCT/CN2017/072170, dated Mar. 27, 2017, with English translation from WIPO.
Notification for Reasons of Refusal from JP app. No. 2018-540410, dated Jul. 30, 2019, with English translation from Global Dossier.
Dr. Chih-Lin I, Defining the Wireless Future—Vision 2020: Perspectives of Mobile Operators (5G: Data Rate and More), IEEE International Conference on Communications, Sydney, Australia, Jun. 13, 2014.

* cited by examiner

METHOD AND DEVICE FOR DYNAMICALLY DETERMINING A PILOT PATTERN

CROSS-REFERENCE TO RELATED APPLICATION

The present application is the U.S. national phase of PCT Application PCT/CN2017/072170 filed on Jan. 23, 2017, which claims a priority to Chinese patent application No. 201610076832.0 filed in China on Feb. 3, 2016, the disclosures of which are incorporated herein by reference in their entireties.

TECHNICAL FIELD

The present disclosure relates to the field of communication technology, and in particular, relates to a method for dynamically determining a pilot pattern and a device for dynamically determining a pilot pattern.

BACKGROUND

A frame structure Type 1 (FS1) is used in a Frequency Division Duplex (FDD) system in a relevant Long Term Evolution (LTE) system. In the FDD system, uplink transmission and downlink transmission employ different carrier frequencies, but use a same frame structure. In each carrier, a radio frame having a duration of 10 milliseconds (ms) includes ten subframes, each of which has a duration of 1 ms and includes two slots, each of the two slots has a duration of 0.5 ms. A duration of a Transmission Time Interval (TTI) for uplink data transmission and downlink data transmission is 1 ms.

In a relevant LTE system, related channel transmission is defined by setting the TTI as 1 ms, i.e., one TTI is one subframe and has a duration of 1 ms. With evolution of mobile communication technology, a mobile communication system in future may achieve smaller latency in a user plane by using shorter TTI, thereby enhancing transmission efficiency and user experience. The TTI duration may be shorter than 0.5 ms, or be in a level of several symbols or even one symbol. In order to adapt to dynamic change of uplink and downlink traffic requirements in a better way and increase a utilization rate of frequency spectrum resources, the TTI occupied by data transmission may change dynamically. When the TTI is changed, pilot density should also be changed accordingly so as to increase a utilization rate of resources. However, no relevant solution is provided yet.

SUMMARY

In view of the above technical problem, a method and a device for dynamically determining a pilot pattern are provided in the present disclosure. The method and device may dynamically determine a pilot pattern according to a TTI duration, and reduce pilot overhead and increase a utilization rate of system resources on basis of meeting a transmission performance.

In a first aspect of the present disclosure, a method for dynamically determining a pilot pattern is provided. The method includes: acquiring a Transmission Time Interval (TTI) duration occupied by transmission of data; and determining a pilot pattern according to the TTI duration occupied by the transmission of the data.

Optionally, the method further includes: transmitting signals or receiving signals according to the pilot pattern.

Optionally, the data includes one or more of uplink data and downlink data, the uplink data includes uplink traffic information and/or uplink control information, and the downlink data includes downlink traffic information and/or downlink control information.

Optionally, the determining a pilot pattern according to the TTI duration occupied by the transmission of the data, includes: when the TTI duration is larger than A symbols, determining that part of all symbols in the TTI have pilots or do not have pilots, wherein A is a positive integer larger than or equal to 1.

Optionally, the determining that part of symbols in the TTI have pilots or do not have pilots, includes: determining that part of the all symbols in the TTI have pilots or do not have pilots, according to a predetermined rule and/or according to a receiving signaling.

Optionally, the determining part of the all symbols in the TTI have pilots or according to the predetermined rule and the signaling, includes: determining that K symbols of the all symbols in the TTI have pilots according to the predetermined rule and/or the signaling, and symbols other than the K symbols of the all symbols in the TTI do not have pilots, wherein K is smaller than or equal to M, and M is the number of the all symbols included in the TTI.

Optionally, the K symbols having pilots are uniformly-spaced K symbols of the all symbols in the TTI or are centrally-symmetric K symbols of the all symbols in the TTI.

Optionally, $K = \lceil M/P \rceil$ or $\lfloor M/P \rfloor$ or $\lceil M \times R \rceil$ or $\lfloor M \times R \rfloor$, wherein P is a predefined or preconfigured positive integer larger than or equal to 2, and R is a predefined or preconfigured decimal fraction or a percentage larger than 0 and smaller than 1.

Optionally, the method further includes determining positions of the symbols having pilots of the all symbols in the TTI, according to the predetermined rule and/or the signaling.

Optionally, when K=1, the symbol having pilots is a first symbol, or a last symbol, or a central symbol, or a $\lceil M/2 \rceil$-th symbol or a $\lfloor M/2 \rfloor$-th symbol of the all symbols in the TTI; and/or when K=2, the symbols having pilots are the first symbol and the last symbol of the all symbols in the TTI, or are centrally-symmetric two symbols of the all symbols in the TTI.

Optionally, the symbols having pilots are $(1+i\times\lceil M/K \rceil)$-th symbols of the all symbols in the TTI or are $(1+i\times\lceil M/K \rceil)$th symbols from the end of the all symbols in the TTI, wherein, i is an integer larger than or equal to 0 and smaller than or equal to $(K-1)$, or i is an integer larger than or equal to 0 and smaller than or equal to $$\left\lfloor \frac{M-1}{\lceil M/K \rceil} \right\rfloor.$$

Optionally, when K is an odd number and M is an odd number, the symbols having pilots are $$\left( \lceil M/2 \rceil \pm i \times \left\lceil \frac{\lceil M/2 \rceil}{\lceil K/2 \rceil} \right\rceil \right)\text{-}th$$

symbols of the all symbols in the TTI, wherein, i is an integer larger than or equal to 0 and smaller than or equal to (K−1)/2, or i is an integer larger than or equal to 1 and smaller than or equal to $$\left\lfloor \frac{M - \lceil M/2 \rceil}{\left\lceil \frac{\lceil M/2 \rceil}{\lceil K/2 \rceil} \right\rceil} \right\rfloor;$$

and/or when K is an even number and M is an even number, the symbols having pilots are (a+i×⌈M/K⌉)-th symbols and (a+i×⌈M/K⌉)-th symbols from the end of the all symbols in the TTI, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor,$$

a is a predefined or preconfigured integer larger than or equal to 1 and smaller than or equal to M/2; and/or when K is an even number and M is an odd number, the symbols having pilots are $$\left( a + i \times \left\lceil \frac{\lfloor M/2 \rfloor}{K/2} \right\rceil \right)\text{-th}$$

symbols and $$\left( a + i \times \left\lceil \frac{\lfloor M/2 \rfloor}{K/2} \right\rceil \right)\text{-th}$$

symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋.

Optionally, when K is an even number, the symbols having pilots are $$\left( a + i \times \left\lceil \frac{\lfloor M/2 \rfloor}{K/2} \right\rceil \right)\text{-th}$$

symbols and $$\left( a + i \times \left\lceil \frac{\lfloor M/2 \rfloor}{K/2} \right\rceil \right)\text{-th}$$

symbols from the end of the all symbols in the TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋.

In a second aspect of the present disclosure, a device for dynamically determining a pilot pattern is provided. The device includes: an acquisition module configured to acquire a Transmission Time Interval (TTI) duration occupied by transmission of data; and a determination module configured to determine a pilot pattern according to the TTI duration occupied by the transmission of the data.

Optionally, the device further includes a transceiver module configured to transmit signals or receive signals according to the pilot pattern.

Optionally, the data includes one or more of uplink data and downlink data, the uplink data includes uplink traffic information and/or uplink control information, and the downlink data includes downlink traffic information and/or downlink control information.

Optionally, the determination module is further configured to, when the TTI duration is larger than A symbols, determine that part of all symbols in a TTI have pilots or do not have pilots, wherein A is a positive integer larger than or equal to 1.

Optionally, the determination module is further configured to determine that part of the all symbols in the TTI have pilots or do not have pilots according to a predetermined rule, and/or according to a receiving signaling.

Optionally, the determination module is further configured to determine that K symbols of the all symbols in the TTI have pilots according to the predetermined rule and/or the signaling, and symbols other than the K symbols of the all symbols in the TTI do not have pilots, wherein K is smaller than or equal to M, and M is the number of the all symbols included in the TTI.

Optionally, the K symbols having pilots are uniformly-spaced K symbols of the all symbols in the TTI, or the K symbols are centrally-symmetric K symbols of the all symbols in the TTI.

Optionally, K=⌈M/P⌉ or ⌊M/P⌋ or ⌈M×R⌉ or ⌊M×R⌋, wherein P is a predefined or preconfigured positive integer larger than or equal to 2, and R is a predefined or preconfigured decimal fraction or a percentage larger than 0 and smaller than 1.

Optionally, the determination module is further configured to determine one or more positions of one or more symbols having pilots of the all symbols in the TTI according to the predetermined rule and/or the signaling.

Optionally, when K=1, the symbol having pilots is a first symbol, or a last symbol, or a central symbol, or a ⌈M/2⌉-th symbol or a ⌊M/2⌋-th symbol of the all symbols in the TTI; and/or when K=2, the symbols having pilots are the first symbol and the last symbol of the all symbols in the TTI, or are centrally-symmetric two symbols of the all symbols in the TTI.

Optionally, the symbols having pilots are (1+i×⌈M/K⌉)-th symbols of the all symbols in the TTI, or are (1+i×⌈M/K⌉)-th symbols from the end of the all symbols in the TTI, wherein, i is an integer larger than or equal to 0 and smaller than or equal to (K−1), or i is an integer larger than or equal to 0 and smaller than or equal to $$\left\lfloor \frac{M-1}{\lceil M/K \rceil} \right\rfloor.$$

Optionally, when K is an odd number and M is an odd number, the symbols having pilots are $$\left( \lceil M/2 \rceil \pm i \times \left\lceil \frac{\lceil M/2 \rceil}{\lceil K/2 \rceil} \right\rceil \right) - th$$

symbols of the all symbols in the TTI, wherein, i is an integer larger than or equal to 0 and smaller than or equal to (K−1)/2, or i is an integer larger than or equal to 1 and smaller than or equal to $$\left\lfloor \frac{M - \lceil M/2 \rceil}{\left\lceil \frac{\lceil M/2 \rceil}{\lceil K/2 \rceil} \right\rceil} \right\rfloor;$$

and/or when K is an even number and M is an even number, the symbols having pilots are (a+i×⌈M/K⌉)-th symbols and (a+i×⌈M/K⌉)-th symbols from the end of the all symbols in the TTI, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor,$$

a predefined or preconfigured integer larger than or equal to 1 and smaller than or equal to M/2; and/or when K is an even number and M is an odd number, the symbols having pilots are $$\left( a + i \times \left\lceil \frac{\lfloor M/2 \rfloor}{K/2} \right\rceil \right) - th$$

symbols of the all symbols in the TTI and $$\left( a + i \times \left\lceil \frac{\lfloor M/2 \rfloor}{K/2} \right\rceil \right) - th$$

symbols from an end of the all symbols in the TTI wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋.

Optionally, when K is an even number, the symbols having pilots are $$\left( a + i \times \left\lceil \frac{\lfloor M/2 \rfloor}{K/2} \right\rceil \right) - th$$

symbols and $$\left( a + i \times \left\lceil \frac{\lfloor M/2 \rfloor}{K/2} \right\rceil \right) - th$$

symbols from the end of the all symbols in the TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋.

In a third aspect of the present disclosure, a device for dynamically determining a pilot pattern is provided, and the device includes a processor, a storage connected to the processor through a bus interface and configured to store computer programs and instructions used by the processor when performing operations; a transceiver connected to the processor and the storage through the bus interface and configured to receive or transmit data under a control of the processor; wherein when the programs and instructions are executed by the processor, the processor implements the above method.

The present disclosure has the following beneficial effects: a pilot pattern may be determined dynamically according to scheduling information, or according to a TTI duration when the TTI duration of data transmission is changeable; pilot overhead may be reduced on basis of meeting transmission performance, pilot density may be reduced in a time domain when a TTI includes multiple symbols, and a utilization rate of system resources may be increased.

DETAILED DESCRIPTION

Figure 1:
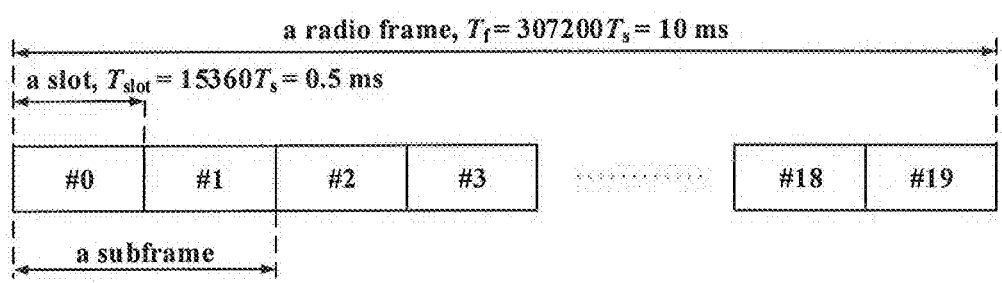
FIG. 1 is a schematic diagram of a frame structure FS1 used in a relevant LTE-FDD system.

Exemplary embodiments of the present disclosure will be described in details hereinafter in conjunction with drawings. Although the exemplary embodiments are shown in the drawings, it should be understood that the embodiments of the present disclosure may be implemented in various ways, and the present disclosure is not limited by the embodiments described herein. On the contrary, these embodiments of the present disclosure are provided to understand the present disclosure more thoroughly, and convey the scope of the present disclosure to one of ordinary skills in the art completely.

A frame structure Type 1 (FS1) used in a relevant Long Term Evolution (LTE) Frequency Division Duplex (FDD) system is shown in FIG. 1. In the FDD system, uplink transmission and downlink transmission employ different carrier frequencies, but uses a same frame structure. In each carrier, a radio frame having a duration of 10 milliseconds (ms) includes ten subframes, each of which has a duration of 1 ms and includes two slots, each of the two slots has a duration of 0.5 ms. A Transmission Time Interval (TTI) for uplink data transmission and downlink data transmission is 1 ms.

Figure 2:
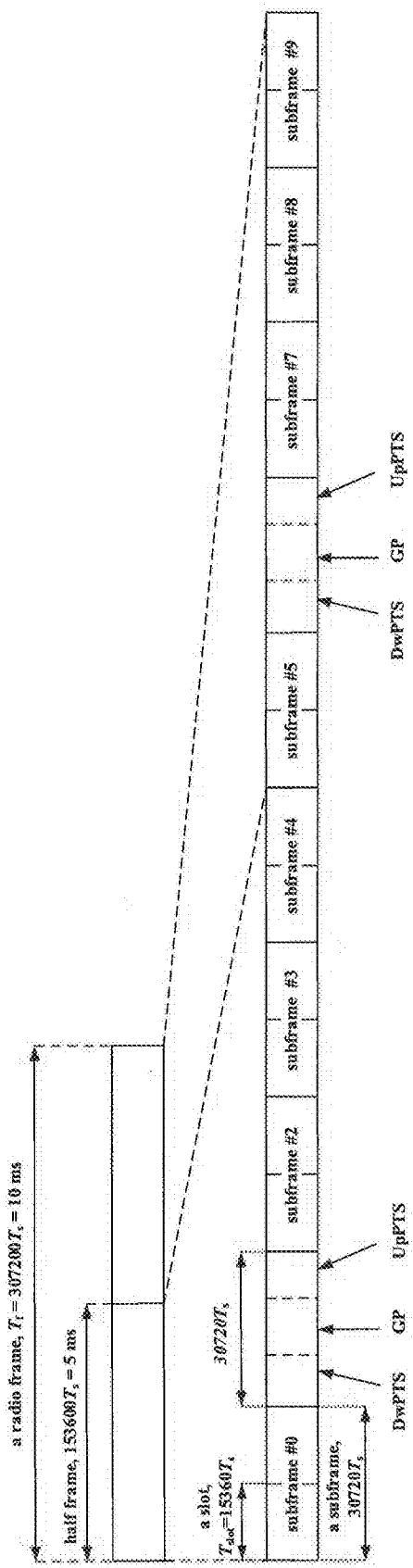
FIG. 2 is a schematic diagram of a frame structure FS2 used in a relevant LTE-FDD system.

A frame structure Type 2 (FS2) used in a relevant LTE Time Division Duplex (TDD) system is shown in FIG. 2. In the TDD system, uplink transmission and downlink transmission employ different subframes or different slots on a same frequency band. In the FS2, each radio frame having a duration of 10 ms includes two half-frames, each of which has a duration of 5 ms; each of the half-frames includes five subframes, and each of the five subframes has a duration of 1 ms. The subframes in the FS2 may be divided into three types: downlink subframes, uplink subframes, and special frames. Each special frame includes Downlink Pilot Time Slots (DwPTS), a Guard Period (GP), and Uplink Pilot Time Slots (UpPTS). The DwPTS may be used to transmit downlink pilots, downlink traffic data and downlink control signalings; the GP is not used to transmit any signal; and the UpPTS is configured to only transmit random access signals and Sounding Reference Symbols (SRSs), but does not transmit uplink traffic data or uplink control signalings. Each half frame includes at least one downlink subframe and at least one uplink subframe, and at most one special frame. The FS2 supports seven uplink-downlink configurations which is shown in Table 1 below.

TABLE 1

Uplink-downlink configurations

| Uplink-downlink Config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

According to Sections in Annex B.2 of 3GPP TR36.912, latency in a User plane (U-plane) in the LTE system includes an eNB processing delay, a frame alignment, a TTI duration, and a UE processing delay. The frame alignment is a waiting time from an arrival time of a traffic to a time at which the traffic acquires a transmission opportunity in an air-interface subframe.

Figure 3:
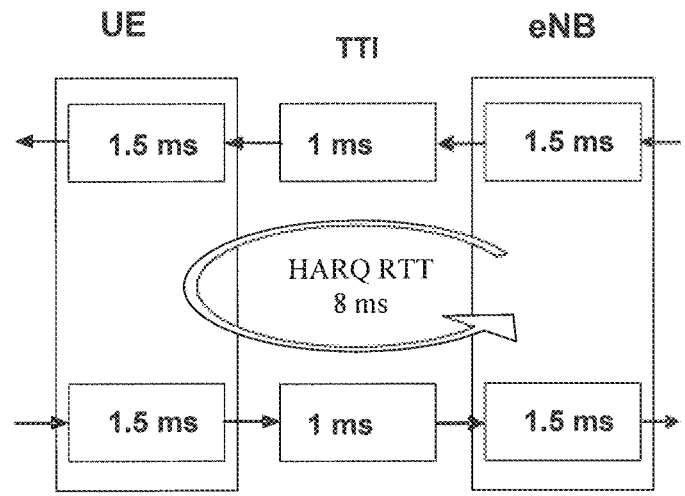
FIG. 3 is a schematic diagram of composition of a U-plane latency in a relevant FDD system.
Figure 4A:
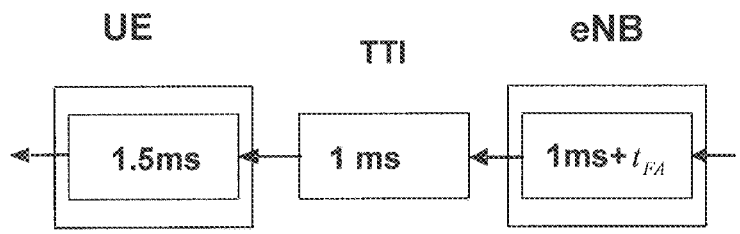
FIG. 4*a* is a schematic diagram of composition of a downlink U-plane latency in the relevant TDD system.
Figure 4B:
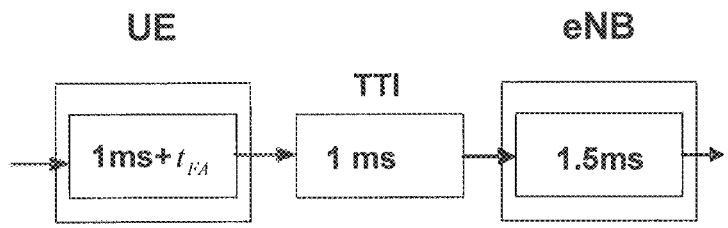
FIG. 4*b* is a schematic diagram of composition of an uplink U-plane latency in the relevant TDD system.

With respect to downlink transmission in the LTE-FDD system, since each subframe in the FDD system has a downlink transmission opportunity, an average of the frame alignment is 0.5 ms. The eNB processing delay is 1 ms in the downlink, and is 1.5 ms in the uplink. The UE processing delay is 1 ms in the uplink, and is 1.5 ms in the downlink. Therefore, a latency of the downlink in the U-plane in the LTE-FDD system=the eNB processing delay (1 ms)+the frame alignment (0.5 ms)+the TTI duration (1 ms)+the UE processing delay (1.5 ms), and equals to 4 ms, without considering retransmission of a Hybrid Automatic Repeat reQuest (HARQ). Similarly, a latency of the uplink in the U-plane in the LTE-FDD system is also 4 ms without considering the retransmission of the HARQ, as shown in FIG. 3, FIG. 4a and FIG. 4b.

With respect to the LTE-TDD system, the eNB processing delay, the UE processing delay and the TTI duration are the same as those in the LTE-FDD system. The frame alignment is related to the arrival time of a traffic and a uplink-downlink configuration used by the system. In case of the uplink-downlink configuration #5 being used, if an eNB completes transmission processings in a subframe #1, then transmission can only be started from a subframe #3 at the earliest. Therefore, an average of the frame alignment from the transmission to the air-interface subframe is 1.5 ms, and an average of the frame alignment of other subframes is 0.5 ms. An average processing time for the frame alignment in the downlink is (1.5+8×0.5)/9=0.6 ms. Without considering the retransmission of the HARQ, Table 2 and Table 3 below show an average time of UL latency in the U-plane and an average time of DL latency in the U-plane corresponding to each uplink-downlink configuration in the TDD system.

TABLE 2

U-plane latency analysis with 0% HARQ BLER for LTE-TDD (average in downlink)

| | | UL/DL configuration | | | | | | |
|---|---|---|---|---|---|---|---|---|
| Step | Description | 0 | 1 | 2 | 3 | 4 | 5 | 6 |
| 1 | eNB Processing Delay | 1 ms | 1 ms | 1 ms | 1 ms | 1 ms | 1 ms | 1 ms |
| 2 | Frame Alignment | 1.7 ms | 1.1 ms | 0.7 ms | 1.1 ms | 0.8 ms | 0.6 ms | 1.4 ms |
| 3 | TTI duration | 1 ms | 1 ms | 1 ms | 1 ms | 1 ms | 1 ms | 1 ms |
| 4 | UE Processing Delay | 1.5 ms | 1.5 ms | 1.5 ms | 1.5 ms | 1.5 ms | 1.5 ms | 1.5 ms |
| | Total one way delay | 5.2 ms | 4.6 ms | 4.2 ms | 4.6 ms | 4.3 ms | 4.1 ms | 4.9 ms |

TABLE 3

U-plane latency analysis with 0% HARQ BLER for LTE-TDD (average in uplink)

| | | UL/DL configuration | | | | | | |
|---|---|---|---|---|---|---|---|---|
| Step | Description | 0 | 1 | 2 | 3 | 4 | 5 | 6 |
| 1 | UE Processing Delay | 1 ms | 1 ms | 1 ms | 1 ms | 1 ms | 1 ms | 1 ms |
| 2 | Frame Alignment | 1.1 ms | 1.7 ms | 2.5 ms | 3.3 ms | 4.1 ms | 5 ms | 1.4 ms |
| 3 | TTI duration | 1 ms | 1 ms | 1 ms | 1 ms | 1 ms | 1 ms | 1 ms |
| 4 | eNB Processing Delay | 1.5 ms | 1.5 ms | 1.5 ms | 1.5 ms | 1.5 ms | 1.5 ms | 1.5 ms |
| | Total one way delay | 4.6 ms | 5.2 ms | 6 ms | 6.8 ms | 7.6 ms | 8.5 ms | 4.9 ms |

In the above U-plane latency analyses, the eNB processing delay, the UE processing delay, and the frame alignment are related to the TTI duration. If the TTI duration is decreased, the U-plane latency may be shortened. Based on relevant frame structures in the LTE, the TTI duration may be shortened to 0.5 ms or less. One TTI duration includes symbols contained in one slot in the frame structures in the LTE system, such as 7 symbols for a general CP or 6 symbols for an extended CP. The TTI duration may be shortened further to be less than one slot, such as several symbols or even one symbol.

Figure 5:
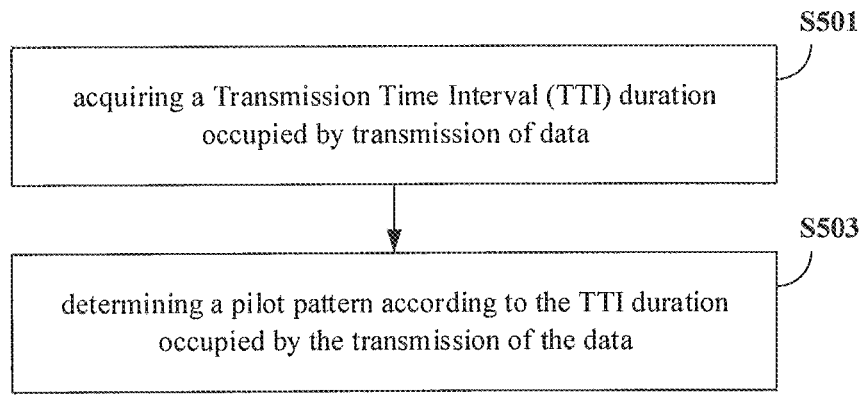
FIG. 5 is a flowchart of a method for dynamically determining a pilot pattern in some embodiments of the present disclosure.

FIG. 5 shows a flowchart of a method for dynamically determining a pilot pattern in the present disclosure. Referring to FIG. 5, the method may be performed by a base station or a user equipment (UE). The method includes steps S501-S503.

Step S501: acquiring a Transmission Time Interval (TTI) duration occupied by transmission of data.

In the embodiment, the data may include one or more of uplink data and downlink data. The uplink data includes uplink traffic information and/or uplink control information, and the downlink data includes downlink traffic information and/or downlink control information.

Step S503: determining a pilot pattern according to the TTI duration occupied by the transmission of the data.

With development of mobile communication technology, a mobile communication system in future may achieve a smaller latency in the U-plane by using a shorter TTI duration, thereby increasing a transmission efficiency and user experience. The TTI duration may be shorter than 0.5 ms, or be in an order of several symbols or even one symbol. In order to adapt to uplink and downlink traffic requirements changed dynamically in a better way, and increasing a utilization rate of frequency spectrum resources, the TTI duration occupied by transmission of data may be changed dynamically. When the TTI duration is changed, pilot density may also be changed accordingly so as to increase a utilization rate of resources.

Specifically, when the TTI duration is larger than A symbols, it may be determined that part of all symbols in a TTI may have pilots or do not have pilots, wherein A is a positive integer larger than or equal to 1.

Optionally, it may be determined that part of all symbols in a TTI have pilots or do not have pilots, by any one or any combination of a first scheme and a second scheme below in the present disclosure.

First scheme: determining that part of the all symbols in a TTI have pilots or do not have pilots according a received signaling. That is, the quantity of symbols having pilots and/or positions of the symbols having pilots may be determined by the first scheme. The signaling may be a broadcast, a high-layer signaling, downlink control information (DCI), or the like. Further, before determining a pilot pattern according to the TTI duration, the base station may also send a high-layer signaling so as to determine in advance whether a UE supports the determining the pilot pattern according to the TTI duration. If the UE supports the determining the pilot pattern according to the TTI duration, then the pilot pattern may be determined according to the scheme described above. If the UE does not support the determining the pilot pattern according to the TTI duration, the base station may determine that pilots are included in each of the all symbols in a TTI. It may also be understood that other schemes may also be used to determine whether the UE supports the determining the pilot pattern according to the TTI duration in the present disclosure.

Second scheme: determining that part of the all symbols in a TTI have pilots or do not have pilots according to a predetermined rule. The quantity of symbols having pilots and/or positions of the symbols having pilots may be determined by the second scheme.

For example, K symbols of the all symbols in a TTI may be determined to have pilots according to the predetermined rule, and symbols other that the K symbols of the all symbols in a TTI may be determined to not have pilots. K is smaller than or equal to M, and M is the quantity of the all symbols included in a TTI.

As another example, one or more positions of one or more symbols having pilots in all symbols in a TTI may be determined according to the predetermined rule. Optionally, it may be determined in advance that a first symbol and a last symbol in a TTI have pilots, and symbols other than the first symbol and the last symbol do not have pilots. Of course, it may also be determined that some other symbols in a TTI have pilots.

When the first scheme is combined with the second scheme, one combination is to determine the quantity K of the symbols having pilots in all symbols in a TTI according to the signaling and determine the positions of the K symbols according to the predetermined rule; and another combination is to determine the quantity of the symbols having pilots of the all symbols in a TTI according to the predetermined rule and determine the positions of the K symbols according to the signaling. Of course, other combination may also be imagined.

The predetermined rule and the signaling include: K symbols in all symbols in a TTI have pilots and symbols other than the K symbols of the all symbols in a TTI do not have pilots, and K is smaller than or equal to M and M is the quantity of the all symbols in a TTI. Optionally, the K symbols having pilots are uniformly-spaced K symbols in all symbols in a TTI or are centrally-symmetric K symbols of the all symbols in a TTI. If the quantity of the all symbols in a TTI is an odd number, then the K symbols may include a central one of the all symbols.

Optionally, K may be preconfigured to be min(m, M), wherein m is a preconfigured or predefined value not larger than M. For example, m may have a value of 2 or 3 or 4.

Optionally, K may be predetermined by the following equations. K=$\lceil M/P \rceil$ or $\lfloor M/P \rfloor$ or $\lceil M \times R \rceil$ or $\lfloor M \times R \rfloor$, wherein "$\lceil \ \rceil$" is a ceiling function, and "$\lfloor \ \rfloor$" is a floor function, and M is the quantity of the all symbols in a TTI, and P is a predefined or preconfigured positive integer larger than or equal to 2, and R is a predefined or preconfigured decimal fraction or a percentage larger than 0 and smaller than 1. For example, P=2, or R=0.5. It should be noted that values of M, P or R are not specifically limited herein.

For example, when K=1, a symbol having pilots is the first symbol, or the last symbol, or the central symbol, or a $\lceil M/2 \rceil$-th symbol or a $\lfloor M/2 \rfloor$-th symbol of the all symbols in a TTI. K is smaller than or equal to M, and M is the quantity of the all symbols in a TTI.

As another example, when K=2, the symbols having pilots are the first symbol and the last symbol of the all symbols in a TTI, or are centrally-symmetric two symbols of the all symbols in a TTI, such as the A-th symbol and the A-th symbol from the end of the all symbols in a TTI. The A is a positive integer and smaller than the quantity of the all symbols in a TTI. For example, the symbols having pilots are the second symbol and the penultimate symbol, or are the third symbol and the third symbol from the end, or the like.

Optionally, in the present disclosure, the symbols having pilots are uniformly spaced. Specifically, the symbols having pilots are the $(1+i \times \lceil M/K \rceil)$-th symbols (it is noted that the quantity of the symbols having pilot is equal to the quantity of values of i, such as the symbols are the first symbol where i equals to 0, the $(1+\lceil M/K \rceil)$-th symbol where i equals to 1, ..., and the $(1+i \times \lceil M/K \rceil)$-th symbol of the all symbols in a TTI, or are the $(1+i \times \lceil M/K \rceil)$-th symbols from the end of the all symbols in a TTI (it is noted that, the quantity of the symbols having pilot is equal to the quantity of values of i, such as the symbols are the first symbol from the end, the $(1+\lceil M/K \rceil)$-th symbol from the end of the all symbols, ..., and the $(1+i \times \lceil M/K \rceil)$-th symbol from the end of the all symbols. Wherein, i is an integer larger than or equal to 0 and smaller than or equal to (K−1), or i is an integer larger than or equal to 0 and smaller than or equal to $$\left\lfloor \frac{M-1}{\lceil M/K \rceil} \right\rfloor.$$

Optionally, in the embodiment, the symbols having pilots are centrally-symmetric K symbols of the all symbols in a TTI. For example, when K is an odd number and M is an odd number, the symbols having pilots are the $$\left(\lceil M/2 \rceil \pm i \times \left\lceil \frac{\lceil M/2 \rceil}{\lceil K/2 \rceil} \right\rceil\right)-th$$

symbols, wherein, i is an integer larger than or equal to 0 and smaller than or equal to (K−1)/2, or i is an integer larger than or equal to 1 and smaller than or equal to $$\left\lfloor \frac{M-\lceil M/2 \rceil}{\left\lceil \frac{\lceil M/2 \rceil}{\lceil K/2 \rceil} \right\rceil} \right\rfloor.$$

When K is an even number and M is an even number, the symbols having pilots are the $(a+i \times \lceil M/K \rceil)$-th symbols and the $(a+i \times \lceil M/K \rceil)$-th symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor,$$

a is a predefined or preconfigured integer larger than or equal to 1 and smaller than or equal to M/2, such as a=1. When K is an even number and M is an odd number, the symbols having pilots are the $$\left(a+i \times \left\lceil \frac{\lfloor M/2 \rfloor}{K/2} \right\rceil\right)-th$$

symbols and the $$\left(a+i \times \left\lceil \frac{\lfloor M/2 \rfloor}{K/2} \right\rceil\right)-th$$

symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to $\lfloor M/2 \rfloor$, such as a=1. When K is an even number and M is an odd number or an even number (which may equate to a case that M is an odd number), i.e., K is an even number and whether M is an odd number or an even number, the symbols having pilots are the $$\left(a + i \times \left\lceil \frac{\lfloor M/2 \rfloor}{K/2} \right\rceil \right)\text{-}th$$

symbols and the $$\left(a + i \times \left\lceil \frac{\lfloor M/2 \rfloor}{K/2} \right\rceil \right)\text{-}th$$

symbols from the end of the all symbols in a TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to $\lfloor M/2 \rfloor$, such as a=1.

Figure 6:
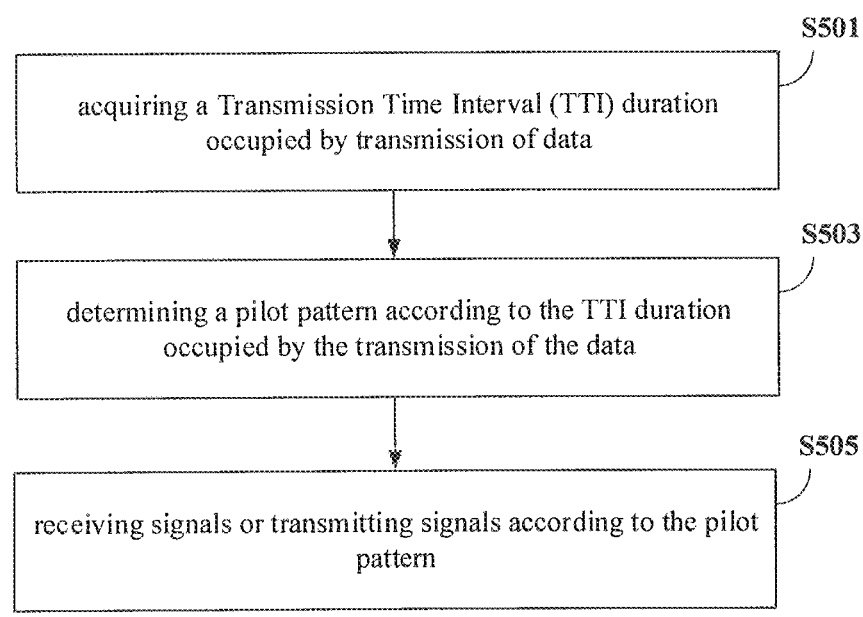
FIG. 6 is a flowchart of a method for dynamically determining a pilot pattern in some embodiments of the present disclosure.

On basis of the above embodiments, referring to FIG. 6, after the step S503, the method further includes a step S505.

Step S505: receiving signals or transmitting signals according to the pilot pattern.

The base station is specifically configured to determine the pilot pattern according to the steps above and transmit signals. The UE is specifically configured to determine the pilot pattern according to the steps above and receiving the signals. Therefore, when a TTI duration of data transmission is changed, the pilot pattern may be dynamically determined according to the TTI duration. On the premise that transmission performance is met, pilot overhead is reduced and a utilization rate of system resources is increased.

The method for determining dynamically a pilot pattern provided in the present disclosure is described in details hereinafter in conjunction with FIG. 7 to FIG. 10. For example, downlink data transmitted to the UE occupies M=5 symbols during downlink transmission (i.e., a TTI duration equals to 5 symbols), the UE may determine that part of the symbols in a TTI have pilots or do not have pilots according to the predetermined rule or the received signaling.

Figure 7:
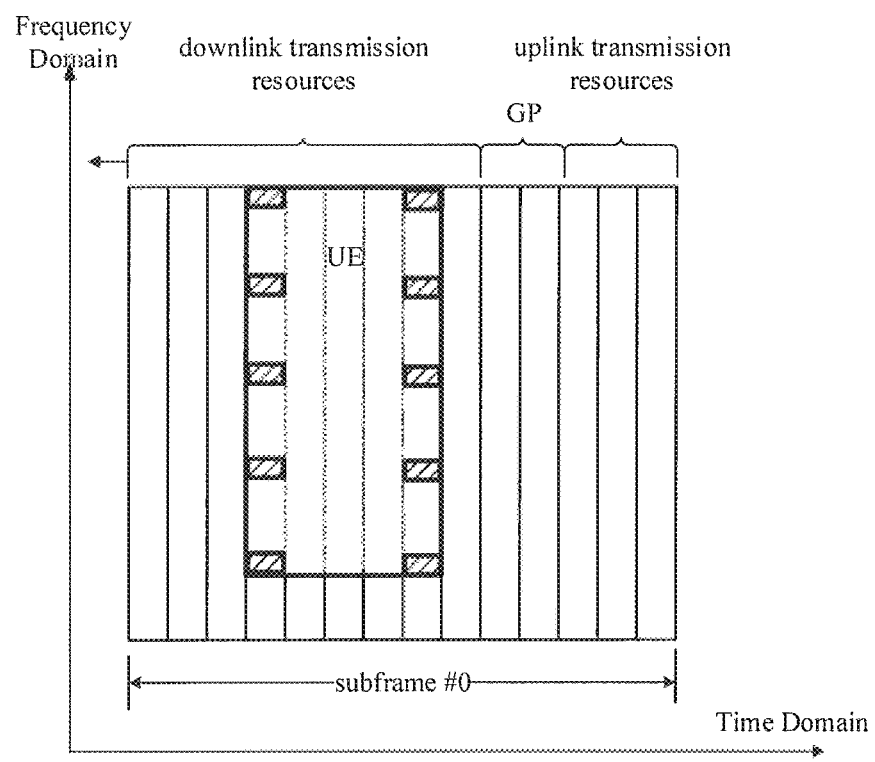
FIG. 7 is a schematic diagram of a pilot pattern in which a first symbol and a last symbol have pilots and other symbols do not have pilots in some embodiments of the present disclosure.

For example, it may always be determined that a first symbol and a last symbol of the all symbols have pilots, and other symbols do not have pilots, as shown in FIG. 7.

Figure 8:
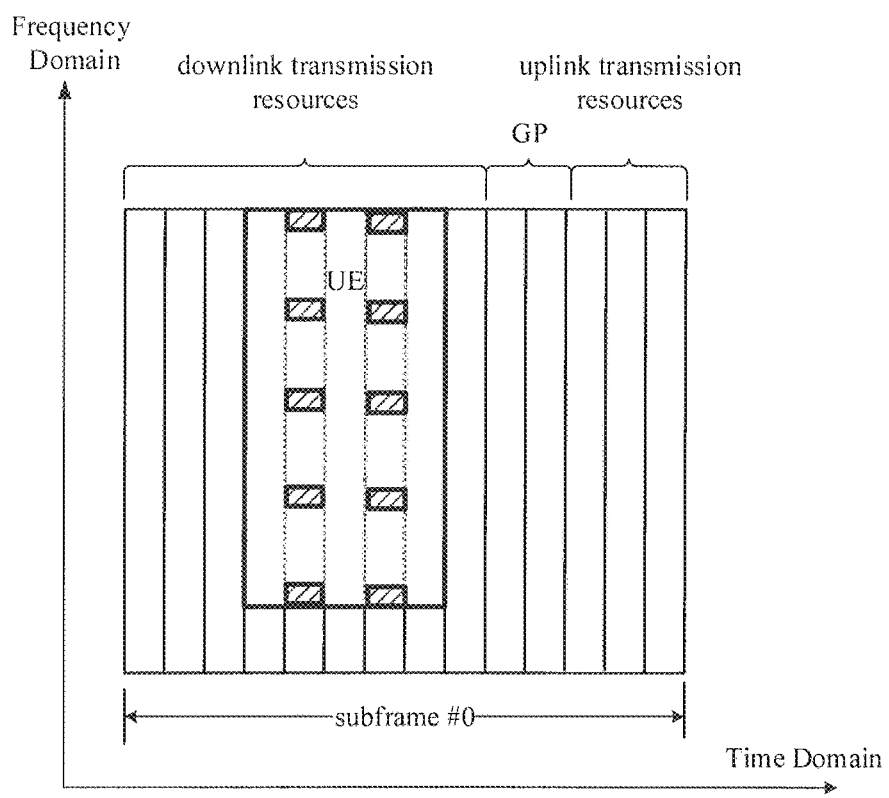
FIG. 8 is a schematic diagram of a pilot pattern in which a second symbol and a penultimate symbol have pilots and other symbols do not have pilots in some embodiments of the present disclosure.

Optionally, it may be determined according to the predetermined rule or the receiving signaling that only K=2 symbols have pilots, and the two symbols are centrally-symmetric. For example, the first symbol and the last symbol may be set to have pilots, as shown in FIG. 7. Optionally, it may be determined that a second symbol and a penultimate symbol have pilots, as shown in FIG. 8.

Optionally, it may be determined that the $$\left(a + i \times \left\lceil \frac{\lfloor M/2 \rfloor}{K/2} \right\rceil \right)\text{-}th$$

symbols and the $$\left(a + i \times \left\lceil \frac{\lfloor M/2 \rfloor}{K/2} \right\rceil \right)\text{-}th$$

symbols from the end of the all symbols in a TTI have pilots, wherein if i=0 and a is predefined to a=1, then the first symbol and the last symbol are determined to have pilots, see FIG. 7.

Optionally, it may be determined according to the predefined rule or the signaling that only K=3 symbols have pilots, and the three symbols are uniformly-spaced symbols of the all symbols in a TTI. For example, it may be defined that the (1+i×⌈M/K⌉)-th symbols have pilots, i=0, 1 and 2, i.e., the first symbol, the third symbol and the fifth symbol, as shown in FIG. 9.

Figure 9:
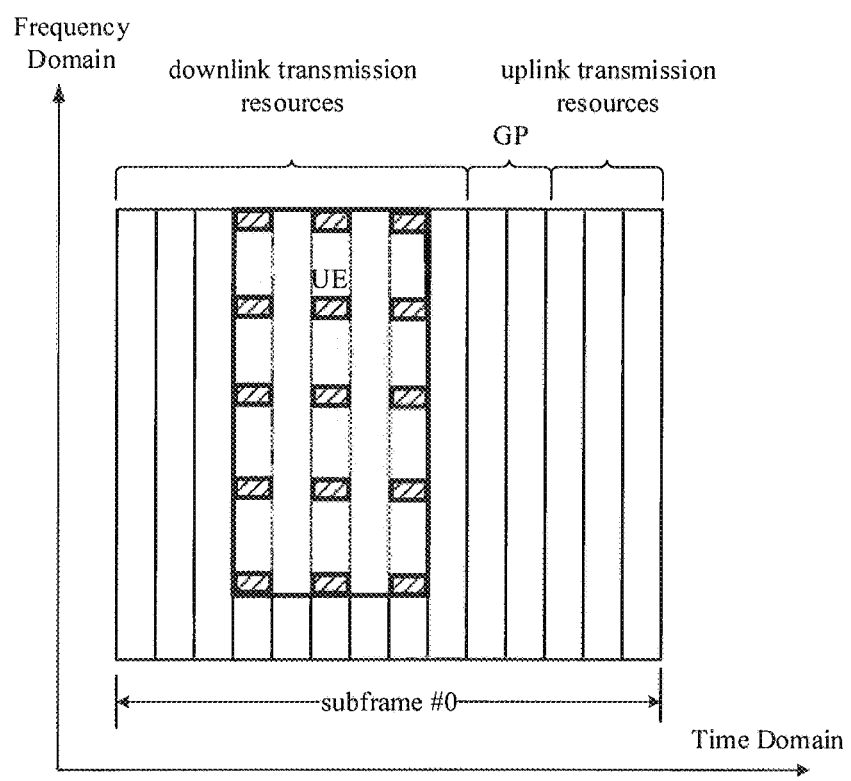
FIG. 9 is a schematic diagram of a pilot pattern in which a first symbol, a third symbol and a fifth symbol have pilots and other symbols do not have pilots in some embodiments of the present disclosure.

Optionally, it may be determined according to the predefined rule or the signaling that only K=3 symbols have pilots, and the three symbols are centrally-symmetric symbols of the all symbols in a TTI. For example, it may be defined that the $$\left(\lceil M/2 \rceil \pm i \times \left\lceil \frac{\lceil M/2 \rceil}{\lceil K/2 \rceil} \right\rceil \right)\text{-}th$$

symbols have pilots, i=0 and 1, i.e., the first symbol, the third symbol and the fifth symbol, as shown in FIG. 9.

Figure 10:
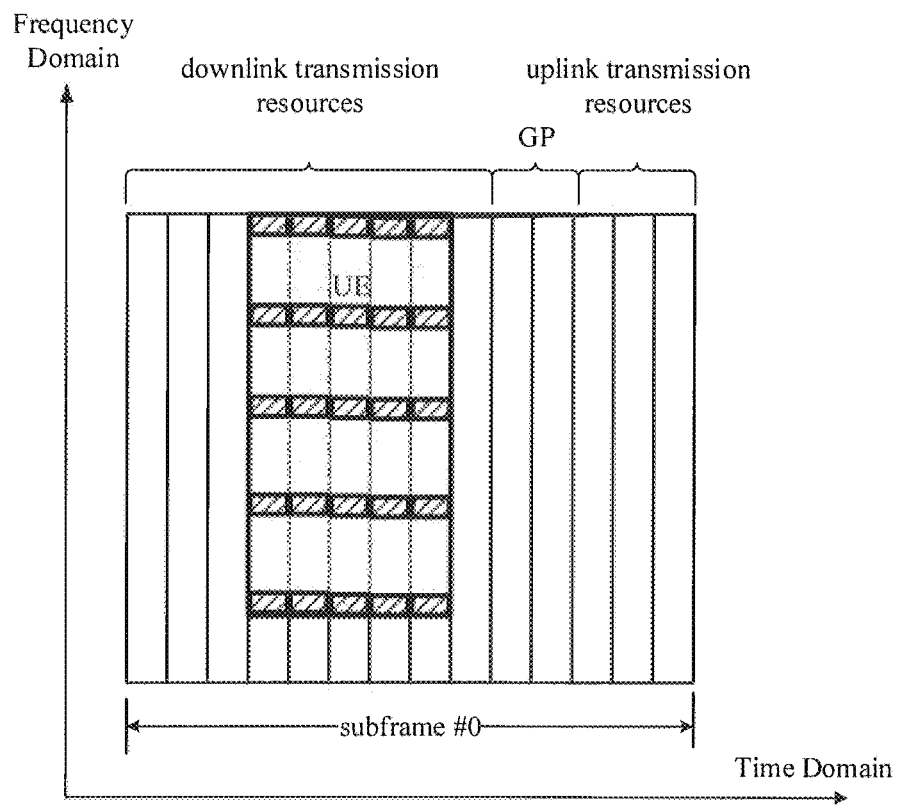
FIG. 10 is a schematic diagram of a pilot pattern in which pilot-density compression is not performed in some embodiments of the present disclosure.

If the UE does not perform compression of pilot density, then it may be determined that each of the all symbols in a TTI has pilots, and the pilot pattern as shown in FIG. 10 is used.

The above embodiments are described in relation to downlink transmission. Uplink transmission may operate similarly. Pilot distribution in each symbol in the uplink transmission may be the same as or different from that in the downlink transmission, and detailed description of uplink transmission will not be provided herein. Positions and density of the pilots in each symbol of the uplink transmission may be different from the above embodiments, and also fall within the scope of the present disclosure. The above embodiments apply to both TDD and FDD.

Figure 11:
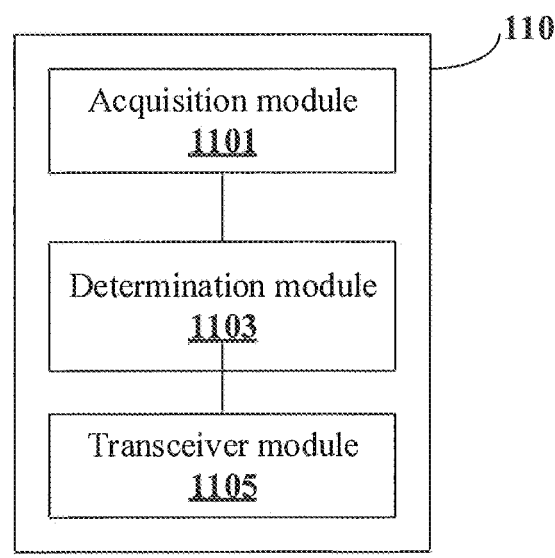
FIG. 11 is a structural schematic diagram of a device for dynamically determining a pilot pattern in some embodiments of the present disclosure.

FIG. 11 shows a device 110 for dynamically determining a pilot pattern. The device 110 includes an acquisition module 1101, a determination module 1103 and a transceiver module 1105.

The acquisition module 1101 is configured to acquire a Transmission Time Interval (TTI) duration occupied by transmission of data. The data may include one or more of uplink data and downlink data. The uplink data includes uplink traffic information and/or uplink control information, and the downlink data includes downlink traffic information and/or downlink control information.

The determination module 1103 is configured to determine a pilot pattern according to the TTI duration occupied by the transmission of the data.

The transceiver module 1105 is configured to transmit signals or receive signals according to the pilot pattern.

In the embodiment, optionally, the determination module 1103 is further configured to, when the TTI duration is larger than A symbols, determine that part of all symbols in a TTI may have pilots or do not have pilots, wherein A is a positive integer larger than or equal to 1.

In the embodiment, optionally, the determination module 1103 is further configured to determine that part of the all symbols in a TTI have pilots or do not have pilots according to the predetermined rule, and/or according to a receiving signaling.

In the embodiment, optionally, the determination module 1103 is further configured to determine that K symbols in all symbols in a TTI have pilots according to the predetermined rule and/or the signaling, and symbols other than the K symbols of the all symbols in a TTI do not have pilots, wherein K is smaller than or equal to M, and M is the quantity of the all symbols included in a TTI. The K symbols having pilots are uniformly-spaced K symbols of the all symbols in a TTI, or the K symbols are centrally-symmetric K symbols of the all symbols in a TTI.

For example, K=⌈M/P⌉ or ⌊M/P⌋ or ⌈M×R⌉ or ⌊M×R⌋, wherein P is a predefined or preconfigured positive integer larger than or equal to 2, and R is a predefined or preconfigured decimal fraction or a percentage larger than 0 and smaller than 1.

Optionally, the determination module 1103 is further configured to determine one or more positions of one or more symbols having pilots of the all symbols in a TTI according to the predetermined rule and/or the signaling.

For example, when K=1, the symbol having pilots is the first symbol, or the last symbol, or the central symbol, or the ⌈M/2⌉-th symbol or the ⌊M/2⌋-th symbol of the all symbols in a TTI.

As another example, when K=2, the symbols having pilots are the first symbol and the last symbol of the all symbols in a TTI, or are centrally-symmetric two symbols of the all symbols in a TTI, Optionally, the symbols having pilots are the (1+i×⌈M/K⌉)-th symbols, or are the (1+i×⌈M/K⌉)-th symbols from the end of the all symbols in a TTI, wherein, i is an integer larger than or equal to 0 and smaller than or equal to (K−1), or i is an integer larger than or equal to 0 and smaller than or equal to $$\left\lfloor \frac{M-1}{\lceil M/K \rceil} \right\rfloor.$$

As another example, when K is an odd number and M is an odd number, the symbols having pilots are the $$\left( \lceil M/2 \rceil \pm i \times \left\lceil \frac{\lceil M/2 \rceil}{\lceil K/2 \rceil} \right\rceil \right)\text{-th}$$

symbols, wherein, i is an integer larger than or equal to 0 and smaller than or equal to (K−1)/2, or i is an integer larger than or equal to 1 and smaller than or equal to $$\left\lfloor \frac{M - \lceil M/2 \rceil}{\left\lceil \frac{\lceil M/2 \rceil}{\lceil K/2 \rceil} \right\rceil} \right\rfloor.$$

As another example, when K is an even number and M is an even number, the symbols having pilots are the (a+i×⌈M/K⌉)-th symbols and the (a+i×⌈M/K⌉)-th symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor.$$

a is a predefined or preconfigured integer larger than or equal to 1 and smaller than or equal to M/2

As another example, when K is an even number and M is an odd number, the symbols having pilots are the $$\left( a + i \times \left\lceil \frac{\lfloor M/2 \rfloor}{K/2} \right\rceil \right)\text{-th}$$

symbols and the $$\left( a + i \times \left\lceil \frac{\lfloor M/2 \rfloor}{K/2} \right\rceil \right)\text{-th}$$

symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lceil M/2 \rceil}{K/2} \right\rceil} \right\rfloor,$$

a is a predefined or preconfigured integer larger than or equal to 1 and smaller than or equal to ⌊M/2⌋.

Optionally, when K is an even number, the symbols having pilots are $$\left( a + i \times \left\lceil \frac{\lfloor M/2 \rfloor}{K/2} \right\rceil \right)\text{-th}$$

symbols and the $$\left( a + i \times \left\lceil \frac{\lfloor M/2 \rfloor}{K/2} \right\rceil \right)\text{-th}$$

symbols from the end of the all symbols in a TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋.

Figure 12:
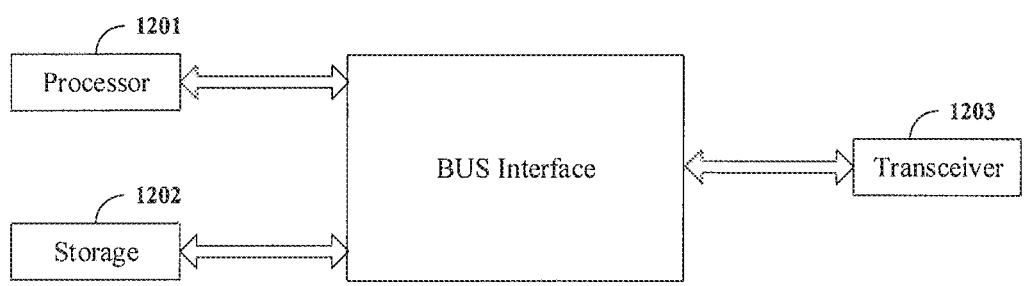
FIG. 12 is a structural schematic diagram of a device for dynamically determining a pilot pattern in some embodiments of the present disclosure.

FIG. 12 shows a device 120 for determining dynamically a pilot pattern according to some embodiments of the present disclosure. The device 120 for determining dynamically a pilot pattern includes a processor 1201, a storage 1202 and a transceiver 1203. The processor 1201 is configured to read programs stored in the storage 1202 to perform the following step: acquiring a Transmission Time Interval (TTI) duration occupied by transmission of data, wherein the data includes one or more of uplink data and downlink data, the uplink data includes uplink traffic information and/or uplink control information, and the downlink data includes downlink traffic information and/or downlink control information. The transceiver 1203 is configured to receive data and transmit data under a control of the processor 1201.

Further, the processor 1201 is configured to read the programs in the storage 1202 to perform the following step: determining a pilot pattern according to the TTI duration occupied by the transmission of the data.

Optionally, the processor 1201 is configured to read the programs in the storage 1202 to perform the following step: when the TTI duration is larger than A symbols, determining that part of all symbols in a TTI have pilots or do not have pilots, wherein A is a positive integer larger than or equal to 1.

Optionally, the processor 1201 is configured to read the programs in the storage 1202 to perform the following step: determining that part of the all symbols in a TTI have pilots or do not have pilots, according to a predetermined rule and/or according to a receiving signaling.

Optionally, the processor 1201 is configured to read the programs in the storage 1202 to perform the following step: determining that K symbols of the all symbols in a TTI have pilots and symbols other than the K symbols of the all symbols in a TTI do not have pilots, according to the predetermined rule or the signaling, wherein K is smaller than or equal to M, and M is the quantity of the all symbols included in a TTI. Optionally, the K symbols having pilots are uniformly-spaced K symbols of the all symbols in a TTI or are centrally-symmetric K symbols of the all symbols in a TTI. For example, K=⌈M/P⌉ or ⌊M/P⌋ or ⌈M×R⌉ or ⌊M×R⌋, wherein P is a predefined or preconfigured positive integer larger than or equal to 2, and R is a predefined or preconfigured decimal fraction or a percentage larger than 0 and smaller than 1.

Optionally, the processor 1201 is configured to read the programs in the storage 1202 to perform the following step: determining one or more positions of one or more symbols having pilots of the all symbols in a TTI according to the predetermined rule or the signaling.

For example, when K=1, the symbol having pilots is the first symbol, or the last symbol, or the central symbol, or the ⌈M/2⌉-th symbol or the ⌊M/2⌋-th symbol of the all symbols in a TTI.

As another example, when K=2, the symbols having pilots are the first symbol and the last symbol of the all symbols in a TTI, or are centrally-symmetric two symbols of the all symbols in a TTI.

Optionally, the symbols having pilots are the (1+i×⌈M/K⌉)th symbols, or are the (1+i×⌈M/K⌉)-th symbols from the end of the all symbols in a TTI, wherein, i is an integer larger than or equal to 0 and smaller than or equal to (K−1), or i is an integer larger than or equal to 0 and smaller than or equal to $$\left\lfloor \frac{M-1}{\lceil M/K \rceil} \right\rfloor.$$

As another example, when K is an odd number and M is an odd number, the symbols having pilots are the $$\left(\lceil M/2\rceil \pm i \times \left\lceil \frac{\lceil M/2 \rceil}{\lceil K/2 \rceil}\right\rceil\right)\text{-}th$$

symbols of the all symbols in a TTI, wherein, i is an integer larger than or equal to 0 and smaller than or equal to (K−1)/2, or i is an integer larger than or equal to 1 and smaller than or equal to $$\left\lfloor \frac{M - \lceil M/2 \rceil}{\left\lceil \frac{\lceil M/2 \rceil}{\lceil K/2 \rceil}\right\rceil} \right\rfloor.$$

As another example, when K is an even number and M is an even number, the symbols having pilots are the (a+i×⌈M/K⌉)-th symbols and the (a+i×⌈M/K⌉)-th symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor,$$

a is a predefined or preconfigured integer larger than or equal to 1 and smaller than or equal to M/2.

As another example, when K is an even number and M is an odd number, the symbols having pilots are $$\left(a + i \times \left\lceil \frac{\lfloor M/2 \rfloor}{K/2}\right\rceil\right)\text{-}th$$

symbols and the $$\left(a + i \times \left\lceil \frac{\lfloor M/2 \rfloor}{K/2}\right\rceil\right)\text{-}th$$

symbols from the end of the all symbols in a TTI, wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2}\right\rceil} \right\rfloor,$$

a is a predefined or preconfigured integer larger than or equal to 1 and smaller than or equal to ⌊M/2⌋.

Optionally, when K is an even number, the symbols having pilots are the $$\left(a + i \times \left\lceil \frac{\lfloor M/2 \rfloor}{K/2}\right\rceil\right)\text{-}th$$

symbols and the $$\left(a + i \times \left\lceil \frac{\lfloor M/2 \rfloor}{K/2}\right\rceil\right)\text{-}th$$

symbols from the end of the all symbols in a TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to $\lfloor M/2 \rfloor$.

Further, the processor 1201 is configured to read the programs in the storage 1202, to perform the following step: transmitting signals or receiving signals according to the pilot pattern.

Optionally, the processor 1201 may be a central processor (CPU), an Application Specific Integrated Circuit (ASIC), a Field Programmable Gate Array (FPGA) or a Complex Programmable Logic Device (CPLD).

In FIG. 12, a bus interface may include any number of buses and bridges connected together, and the bus interface is configured to connect various circuits including one or more processors such as the processor 1201 and one or more storages such as the storage 1202 together. The bus interface may also connect together various other circuits such as peripheral circuits, voltage regulator, or power management circuits. These circuits are known in the art, and details descriptions thereof will not be provided herein. The bus interface provides an interface. The transceiver 1203 may be a plurality of elements, such as a transmitter and a receiver, for providing communication function with other devices through a transmission medium. The processor 1201 may manage the bus interface and process general transactions, and the storage 1202 may store data used by the processor 1201 when the processor 1201 executes the programs.

It may be understood that methods and devices disclosed in the present disclosure may be implemented in other ways. For example, the devices described above are only illustrative. Division of units is only made logically. In practice, other divisions may also be implemented. For example, multiple units or assemblies may be combined or integrated into another system, or some features may be ignored or are not executed. Further, couplings or direct couplings or communication connections displayed or discussed between elements may be direct connections, indirect connections or communication connections through some interfaces, devices or units and may be in forms of electrical connections, mechanical connections or other connections.

Functional units in the embodiments of the present disclosure may be integrated in one processing device, or the units may be incorporated in separated processing devices, or two or more units may be integrated in one device. The integrated units may be implemented in a form of hardware, or in a form of hardware and software.

Units implemented in a form of software in the present disclosure may be stored in one computer readable storage medium. The units implemented in the form of software may be stored in one storage medium, the storage medium includes several instructions configured to enable one computer (such as a personal computer, a server, or a network device, or the like) to execute the steps of the methods in the embodiments of the present disclosure. The storage medium includes a USB flash disk, a removable disk, a Read Only Memory (ROM), a Random Access Memory (RAM), a magnetic disc or a compact disc or some other medium capable of storing programs.

The above are only optional embodiments of the present disclosure. It should be noted that those skilled in the art may make various modifications and embellishments without departing from the principle of the present disclosure, and the modifications and embellishments also fall into the scope of the present disclosure.

What is claimed is:

1. A method for dynamically determining a pilot pattern, comprising:

acquiring a Transmission Time Interval (TTI) duration occupied by transmission of data;

determining a pilot pattern according to the TTI duration occupied by the transmission of the data;

wherein the determining the pilot pattern according to the TTI duration occupied by the transmission of the data, comprises: when the TTI duration is larger than A symbols, determining that part of all symbols in a TTI have pilots or do not have pilots according to a predetermined rule and/or a signaling, wherein A is a positive integer larger than or equal to 1; and determining one or more positions of one or more symbols having pilots of the all symbols in the TTI, according to the predetermined rule and/or the signaling, wherein at least one of following (a)-(e):

(a) the symbols having pilots are $(1+i\times\lceil M/K\rceil)$-th symbols of the all symbols in the TTI duration or are $(1+i\times\lceil M/K\rceil)$-th symbols from an end of the all symbols in the TTI duration, wherein, i is an integer larger than or equal to 0 and smaller than or equal to (K−1), or i is an integer larger than or equal to 0 and smaller than or equal to $$\left\lfloor \frac{M-1}{\lceil M/K \rceil} \right\rfloor;$$

(b) when K is an odd number and M is an odd number, the symbols having pilots are $$\left(\lceil M/2 \rceil \pm i \times \left\lceil \frac{\lceil M/2 \rceil}{\lceil K/2 \rceil} \right\rceil \right)\text{-}th$$

symbols of the all symbols in the TTI duration, wherein, i is an integer larger than or equal to 0 and smaller than or equal to (K−1)/2, or i is an integer larger than or equal to 1 and smaller than or equal to $$\left\lfloor \frac{M - \lceil M/2 \rceil}{\left\lceil \frac{\lceil M/2 \rceil}{\lceil K/2 \rceil} \right\rceil} \right\rfloor;$$

(c) when K is an even number and M is an even number, the symbols having pilots are $(a+i\times\lceil M/K\rceil)$-th symbols and $(a+i\times\lceil M/K\rceil)$-th symbols from an end of the all symbols in the TTI duration, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor,$$

a is a predefined or preconfigured integer larger than or equal to 1 and smaller than or equal to M/2;
(d) when K is an even number and M is an odd number, the symbols having pilots are $$\left( a + i \times \left\lceil \frac{\lfloor M/2 \rfloor}{K/2} \right\rceil \right)\text{-}th$$

symbols of the all symbols in the TTI duration and $$\left( a + i \times \left\lceil \frac{\lfloor M/2 \rfloor}{K/2} \right\rceil \right)\text{-}th$$

symbols from the end of the all symbols in the TTI duration, wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to $\lfloor M/2 \rfloor$; and
(e) when K is an even number, the symbols having pilots are $$\left( a + i \times \left\lceil \frac{\lfloor M/2 \rfloor}{K/2} \right\rceil \right)\text{-}th$$

symbols and $$\left( a + i \times \left\lceil \frac{\lfloor M/2 \rfloor}{K/2} \right\rceil \right)\text{-}th$$

symbols from an end of the all symbols in the TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to $\lfloor M/2 \rfloor$,
wherein, K is a quantity of the one or more symbols having pilots of the all symbols in the TTI duration, K is smaller than or equal to M, and M is a quantity of the all symbols in the TTI duration, and
$\lceil \ \rceil$ is a ceiling function, and $\lfloor \ \rfloor$ is a floor function.

2. The method according to claim 1, wherein the data comprises one or more of uplink data and downlink data, the uplink data comprises uplink traffic information and/or uplink control information, and the downlink data comprises downlink traffic information and/or downlink control information.

3. The method according to claim 2, wherein, the determining that part of the all symbols in a TTI have pilots according to the predetermined rule and the signaling, comprises:
determining that K symbols of the all symbols in the TTI have pilots according to the predetermined rule and/or the signaling, and symbols other than the K symbols of the all symbols in the TTI do not have pilots, wherein K is smaller than or equal to M, and M is the quantity of the all symbols comprised in the TTI.

4. The method according to claim 3, wherein the K symbols having pilots are uniformly-spaced K symbols of the all symbols in the TTI or are centrally-symmetric K symbols of the all symbols in the TTI.

5. The method according to claim 3, wherein K=$\lceil M/P \rceil$ or $\lfloor M/P \rfloor$ or $\lceil M \times R \rceil$ or $\lfloor M \times R \rfloor$, wherein P is a predefined or preconfigured positive integer larger than or equal to 2, and R is a predefined or preconfigured decimal fraction or a percentage larger than 0 and smaller than 1.

6. A device for dynamically determining a pilot pattern, comprising:
an acquisition module configured to acquire a Transmission Time Interval (TTI) duration occupied by transmission of data; and
a determination module configured to determine a pilot pattern according to the TTI duration occupied by the transmission of the data,
wherein the determination module is further configured to:
when the TTI duration is larger than A symbols, determine that part of all symbols in the TTI duration have pilots or do not have pilots according to a predetermined rule and/or according to a received signaling, wherein A is a positive integer larger than or equal to 1; and
determine one or more positions of one or more symbols having pilots of the all symbols in the TTI duration, according to the predetermined rule and/or the signaling,
wherein, at least one of following (a)-(e):
(a) the symbols having pilots are (1+i×$\lceil M/K \rceil$)-th symbols of the all symbols in the TTI duration or are (1+i×$\lceil M/K \rceil$)-th symbols from an end of the all symbols in the TTI duration, wherein, i is an integer larger than or equal to 0 and smaller than or equal to (K−1), or i is an integer larger than or equal to 0 and smaller than or equal to $$\left\lfloor \frac{M-1}{\lceil M/K \rceil} \right\rfloor;$$

(b) when K is an odd number and M is an odd number, the symbols having pilots are $$\left( \lceil M/2 \rceil \pm i \times \left\lceil \frac{\lceil M/2 \rceil}{\lceil K/2 \rceil} \right\rceil \right)\text{-}th$$

symbols of the all symbols in the TTI duration, wherein, i is an integer larger than or equal to 0 and smaller than or equal to (K−1)/2, or i is an integer larger than or equal to 1 and smaller than or equal to $$\left\lfloor \frac{M - \lceil M/2 \rceil}{\left\lceil \frac{\lceil M/2 \rceil}{\lceil K/2 \rceil} \right\rceil} \right\rfloor;$$

(c) when K is an even number and M is an even number, the symbols having pilots are (a+i×⌈M/K⌉)-th symbols and (a+i×⌈M/K⌉)-th symbols from an end of the all symbols in the TTI duration, wherein i is an integer larger than or equal to 0 and smaller than or equal to (K/2−1), or i is an integer larger than or equal to 0 and smaller than or equal to $$\left\lfloor \frac{M/2}{\lceil M/K \rceil} \right\rfloor,$$

a is a predefined or preconfigured integer larger than or equal to 1 and smaller than or equal to M/2;

(d) when K is an even number and M is an odd number, the symbols having pilots are $$\left(a + i \times \left\lceil \frac{\lfloor M/2 \rfloor}{K/2} \right\rceil \right)\text{-}th$$

symbols of the all symbols in the TTI duration and $$\left(a + i \times \left\lceil \frac{\lfloor M/2 \rfloor}{K/2} \right\rceil \right)\text{-}th$$

symbols from the end of the all symbols in the TTI duration, wherein i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋; and (e) when K is an even number, the symbols having pilots are $$\left(a + i \times \left\lceil \frac{\lfloor M/2 \rfloor}{K/2} \right\rceil \right)\text{-}th$$

symbols and $$\left(a + i \times \left\lceil \frac{\lfloor M/2 \rfloor}{K/2} \right\rceil \right)\text{-}th$$

symbols from an end of the all symbols in the TTI, wherein, i is an integer larger than or equal to 0 and smaller than or equal to (K/2−1), or i is an integer larger than or equal to 0 and smaller than or equal to $$\left\lfloor \frac{\lfloor M/2 \rfloor}{\left\lceil \frac{\lfloor M/2 \rfloor}{K/2} \right\rceil} \right\rfloor,$$

a is a predefined or preconfigured integer larger than or equal to 1 and smaller than or equal to ⌊M/2⌋, wherein, K is a quantity of the one or more symbols having pilots of the all symbols in the TTI duration, K is smaller than or equal to M, and M is a quantity of the all symbols in the TTI duration, and ⌈ ⌉ is a ceiling function, and ⌊ ⌋ is a floor function.

7. The device according to claim 6, wherein the data comprises one or more of uplink data and downlink data, the uplink data comprises uplink traffic information and/or uplink control information, and the downlink data comprises downlink traffic information and/or downlink control information.

8. The device according to claim 7, wherein the determination module is further configured to determine that K symbols of the all symbols in the TTI have pilots according to the predetermined rule and/or the signaling, and symbols other than the K symbols of the all symbols in the TTI do not have pilots, wherein K is smaller than or equal to M, and M is the quantity of the all symbols in the TTI.

9. The device according to claim 8, wherein the K symbols having pilots are uniformly-spaced K symbols of the all symbols in the TTI, or the K symbols are centrally-symmetric K symbols of the all symbols in the TTI; and/or
K=⌈M/P⌉ or ⌊M/P⌋ or ⌈M×R⌉ or ⌊M×R⌋, wherein P is a predefined or preconfigured positive integer larger than or equal to 2, and R is a predefined or preconfigured decimal fraction or a percentage larger than 0 and smaller than 1.

10. A device for dynamically determining a pilot pattern, comprising:
a processor;
a storage connected to the processor through a bus interface and configured to store computer programs and instructions used by the processor when performing operations;
a transceiver connected to the processor and the storage through the bus interface and configured to receive or transmit data under a control of the processor;
wherein when the programs and instructions are executed by the processor, the processor implements the method according to claim 1.

* * * * *